No. 658,133. Patented Sept. 18, 1900.
E. ULLMANN.
STALK RAISING DEVICE FOR REAPING MACHINES.
(Application filed Oct. 11, 1899.)
(No Model.)
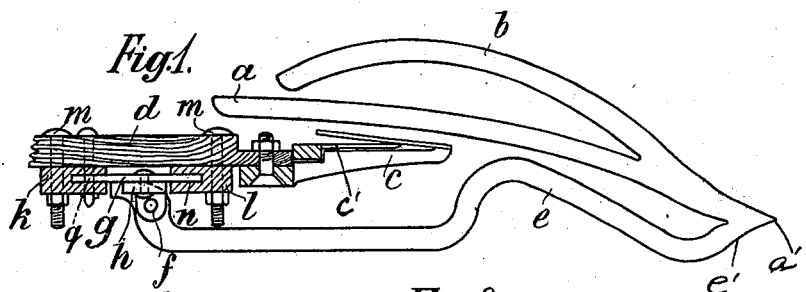
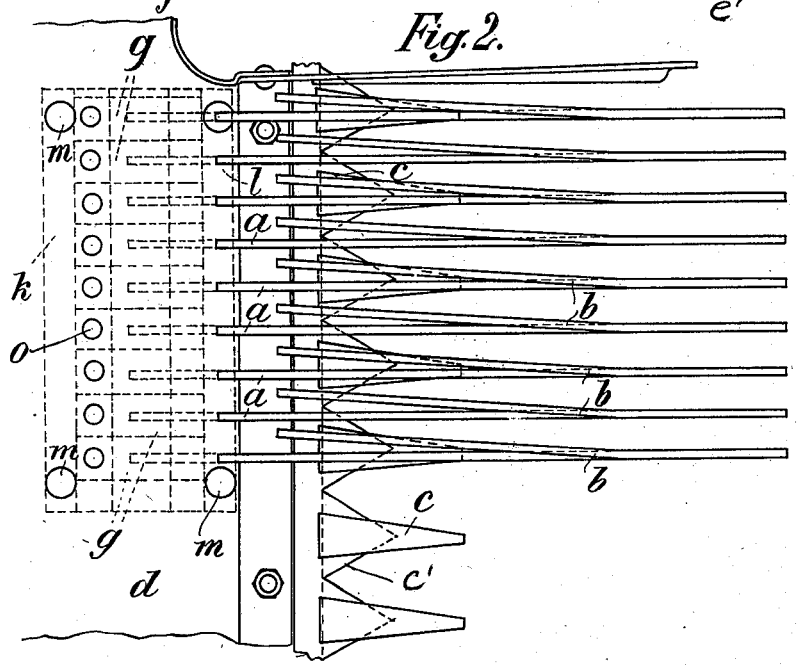
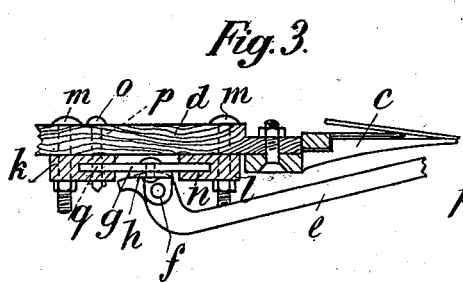
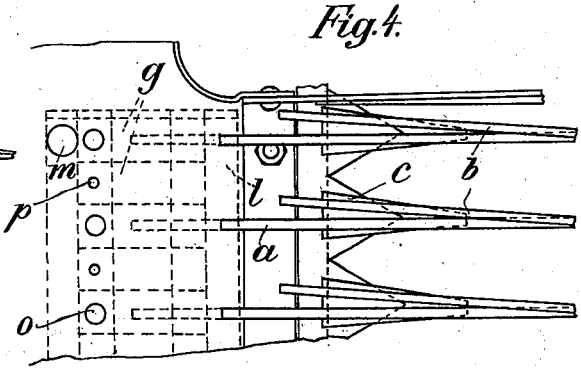
WITNESSES:
INVENTOR
Ernst Ullmann,
BY
Richardson
ATTORNEYS

UNITED STATES PATENT OFFICE.

ERNST ULLMANN, OF DOMINIUM BUCHHOLZ-NEAR-DROSSEN, GERMANY.

STALK-RAISING DEVICE FOR REAPING-MACHINES.

SPECIFICATION forming part of Letters Patent No. 658,133, dated September 18, 1900.

Application filed October 11, 1899. Serial No. 733,302. (No model.)

*To all whom it may concern:*

Be it known that I, ERNST ULLMANN, manager, a subject of the Emperor of Germany, residing at Dominium Buchholz-near-Drossen, Germany, have invented Improvements in Stalk-Raising Devices for Reaping-Machines, of which the following is a specification.

It is the object of my invention to provide means for preventing the cutter-bar of a reaping-machine from injuring the ears of grain when the stalks carrying said ears are bent down or lie approximately parallel with the ground over which the reaping-machine moves.

My invention includes bars arranged adjacent to the finger-bar of the reaping-machine, said bars being joined at their front ends and adapted to separate the stalks, the rear ends of the bars being in staggered relation to form a grating which will support the ears of grain in a plane above the cutter-bar, and thus prevent the same from being damaged.

My invention includes other features hereinafter pointed out.

In the drawings, Figure 1 is a cross-sectional view of the finger-beam with my invention in place. Fig. 2 is a plan view of part of a finger-beam with my invention in place. Figs. 3 and 4 are detail views similar to Figs. 1 and 2, respectively, with the parts in a slightly-different position from that shown in said figures.

In the drawings, $d$ is the finger-beam, $c$ the fingers projecting therefrom, and $c'$ the cutter-bar.

My improvements comprise the bars $a\ b$, which extend over the fingers $c$ and the cutter, inclining downwardly to the front, where each two of the bars $a\ b$ are joined together. The forward point $a'$ of the attachment is below the plane of the cutter-bar, and as the reaper advances the said points entering below the inclined stalks will cause them to ride along the upwardly-inclined or arched edges of the bars, thus lifting the ears of grain up out of the way of the cutter-bar and preventing all possibility of damage thereto. The bars $a$ and $b$ diverge rearwardly from their forward point of junction, as in Fig. 2, and their rear ends therefore lie in staggered relation, forming a close grating to support the ears against falling down. The front ends of each pair of bars $a\ b$ being joined present wide spaces between the adjacent pairs, so as to receive the stalks.

Each pair of bars $a\ b$ is carried by a bar $e$, which is pivoted in ears to a plate $g$, adapted to be adjusted in grooves formed in rails $k\ l$, bolted at $m$ to the under side of the finger-beam $d$. The bar $e$ has at its rear end beyond the pivot a nose $h$, which, bearing against the under side of the plate $g$, limits the downward movement of the bar $e$, but allows said bar to swing upwardly on its pivot in case of obstructions, such as small stones, striking against the front end of the bar $e$, which is curved at $e'$ to ride over such obstructions. The plates $g$ are adjustable, and each plate carries a bar $e$, which in turn carries a pair of bars $a\ b$. By adjusting the plates the distance between the front ends of the pairs of bars $a\ b$ may be changed, Fig. 2 showing, for instance, a close arrangement of said bars, and Fig. 4 an arrangement in which the bars have been more widely separated. The plates when adjusted along the finger-beam can be fixed in position by pins $o$, passing down through the openings $p$ in the finger-beam and openings $q$ in the plate $g$. The adjustment of the plate $g$ depends upon the character of the grain to be cut.

I claim—

1. In combination, the finger-bar of a harvester and the bars $a$ and $b$ projecting forward of the finger-bar and with their rear ends in a plane above the finger-bar, the front ends of the bars $a$ and $b$ being joined while their rear ends are in different vertical planes or in staggered relation, substantially as described.

2. In combination, the finger-bar, the bars $a$ and $b$ projecting forward in relation to the finger-bar, the guide-bars $k$, $l$, attached to the finger-bar, the plate $g$ guided to move in the bars $k$, $l$, and a hinged connection between the bars $a$, $b$, and the plates $g$, substantially as described.

In witness whereof I have hereunto set my hand in presence of two witnesses.

ERNST ULLMANN.

Witnesses:
 HENRY HASPER,
 WOLDEMAR HAUPT.